United States Patent
Gabriel et al.

(10) Patent No.: US 10,673,480 B2
(45) Date of Patent: Jun. 2, 2020

(54) DEVICE FOR TRANSMITTING AND RECEIVING MOBILE RADIO SIGNALS BY MEANS OF A STATIONARY ANTENNA

(71) Applicant: Kathrein-Werke KG, Rosenheim (DE)

(72) Inventors: Roland Gabriel, Griesstätt (DE); Georg Schell, Raubling (DE); Michael Heisenberg, Kolbermoor (DE)

(73) Assignee: Kathrein-Werke KG, Rosenheim (DE)

( * ) Notice: Subject to any disclaimer, the term of this patent is extended or adjusted under 35 U.S.C. 154(b) by 0 days.

(21) Appl. No.: 15/759,336

(22) PCT Filed: Sep. 9, 2016

(86) PCT No.: PCT/EP2016/071291
§ 371 (c)(1),
(2) Date: Mar. 12, 2018

(87) PCT Pub. No.: WO2017/042327
PCT Pub. Date: Mar. 16, 2017

(65) Prior Publication Data
US 2018/0262228 A1 Sep. 13, 2018

(30) Foreign Application Priority Data
Sep. 10, 2015 (DE) .......................... 10 2015 011 875

(51) Int. Cl.
*H04B 1/40* (2015.01)
*H04B 7/0413* (2017.01)
(Continued)

(52) U.S. Cl.
CPC ............. *H04B 1/40* (2013.01); *H04B 7/0413* (2013.01); *H04B 7/10* (2013.01); *H04W 88/085* (2013.01); *H04B 7/08* (2013.01)

(58) Field of Classification Search
CPC .......... H04B 7/08; H04B 1/38; H04B 1/0075; H04B 7/10; H04L 5/14
See application file for complete search history.

(56) References Cited

U.S. PATENT DOCUMENTS 8,666,307 B2 3/2014 Green, Sr. et al.
10,432,308 B1 * 10/2019 Turgeon ............... H04B 7/2041
(Continued)

FOREIGN PATENT DOCUMENTS

DE 10 2004 062 000 A1 7/2006
DE 10 2010 018 509 10/2011
(Continued)

OTHER PUBLICATIONS

Communication from the Examining Division dated Jan. 21, 2019, issued in European Application No. 16763511.9, 1 page.
(Continued)

*Primary Examiner* — Aristocratis Fotakis
(74) *Attorney, Agent, or Firm* — Nixon & Vanderhye, P.C.

(57) ABSTRACT

A device for transmitting and receiving signals for a radio network comprises an air interface; a MIMO antenna; and an antenna-side frequency conversion device provided between the air interface and a home distribution network. The antenna-side frequency conversion device comprises at least one frequency converter via which the receive signals obtained via the at least one polarization of the dual-polarized antenna or via at least one of the at least two antennae can be converted into an intermediate frequency range that is unused and/or free in the home distribution network. At least one receive-side frequency back-conversion device is provided between the home distribution network and a receiver. The receive-side frequency back-conversion device is configured in such a way that a frequency back-conversion of the frequencies converted into an (Continued)

unused frequency range can be fed back into the received frequency range.

14 Claims, 4 Drawing Sheets

(51) Int. Cl.
 *H04B 7/10* (2017.01)
 *H04W 88/08* (2009.01)
 *H04B 7/08* (2006.01)

(56) References Cited

U.S. PATENT DOCUMENTS

| | | | |
|---|---|---|---|
| 2005/0176458 A1 | 8/2005 | Shklarsky et al. | |
| 2005/0215288 A1 | 9/2005 | Beaudin et al. | |
| 2006/0225098 A1* | 10/2006 | James | H01Q 1/125 725/63 |
| 2007/0173288 A1 | 7/2007 | Skarby et al. | |
| 2008/0303739 A1* | 12/2008 | Sharon | H01Q 25/007 343/876 |
| 2010/0313232 A1* | 12/2010 | Norin | H04H 20/63 725/110 |
| 2013/0128936 A1* | 5/2013 | Kennard | H04L 5/14 375/222 |
| 2013/0278304 A1* | 10/2013 | Goldblatt | H03B 19/00 327/117 |
| 2015/0295987 A1* | 10/2015 | Finocchiaro | H04N 21/222 709/203 |
| 2015/0365160 A1* | 12/2015 | Ling | H04H 20/08 370/317 |
| 2016/0294441 A1* | 10/2016 | Fazlollahi | H04B 3/36 |
| 2017/0195054 A1* | 7/2017 | Ashrafi | H04B 10/40 |

FOREIGN PATENT DOCUMENTS

| | | |
|---|---|---|
| EP | 1 085 678 | 3/2001 |
| GB | 2 300 549 A | 11/1996 |
| JP | H11 122131 | 4/1999 |

OTHER PUBLICATIONS

International Search Report for PCT/EP2016/071291, dated Dec. 9, 2016, 4 pages.

Written Opinion of the ISA for PCT/EP2016/071291, dated Dec. 9, 2016, 6 pages.

English translation of the International Preliminary Report on Patentability and Written Opinion of the International Searching Authority dated Mar. 22, 2018, issued in corresponding International Application No. PCT/EP2016/071291.

* cited by examiner

DEVICE FOR TRANSMITTING AND RECEIVING MOBILE RADIO SIGNALS BY MEANS OF A STATIONARY ANTENNA

This application is the U.S. national phase of International Application No. PCT/EP2016/071291 filed 9 Sep. 2016, which designated the U.S. and claims priority to DE Patent Application No. 10 2015 011 875.7 filed 10 Sep. 2015, the entire contents of each of which are hereby incorporated by reference.

Nowadays, more and more data are being transmitted via mobile radio networks. Mobile terminals such as mobile phones and smartphones, as well as notebooks, tablets, etc. which are equipped with a radio device, are becoming increasingly more widespread.

If mobile communications terminals of this kind are also used in buildings, for example, this may also lead to, inter alia, worsened antenna reception depending on the construction of the building (if, for example, the building has been produced primarily using concrete and reinforcements).

Additional steps are necessary for making a connection possible or at least improving the quality of an existing connection, as appropriate, in these conditions. One of these steps can be to provide additional antennas in order to achieve higher antenna gain.

Communication can then be established, within a cell of a mobile communications station, with the remote, usually stationary antenna, and communication therefrom can then be established with the mobile communications terminal, via a cable connection or a further radio link, for example.

An additional remote device for transmitting and receiving mobile communications signals in various frequency ranges is known, for example, from DE 10 2010 018 509 B4. A device of this kind can, for example, have two or three antennas, each of the transmitting and receiving antennas being operated for a different frequency range.

However, it is often expedient to use separate remote antennas which have a corresponding antenna gain in order to achieve a high data rate, also for connecting new mobile communications standards, for example in the form of the LTE (Long Term Evolution) standard. According to this standard, both a diversity operation and a MIMO operation can be achieved on two separate receiving threads, for example.

The remote passive antennas, which are used to improve the receiving properties, can have, for example, two connections which make it possible to operate the antennas in two polarisations. In addition, amplifiers which contain an additional reception amplifier for the two cables can also be used, as is likewise described in DE 10 2010 018 509 B4.

Against this background, the object of the invention is to create and provide an improved system for transmitting and receiving mobile communications signals by means of a stationary antenna.

This object is achieved according to the invention by way of the features specified in claim 1. Advantageous embodiments of the invention are specified in the dependent claims.

The invention makes it possible to greatly improve the transmission and reception of mobile communications signals, particularly also in buildings, using relatively simple means, or even to partially enable this transmission and reception if, depending on the building in particular, the transmitted signals (downlinks) transmitted from a mobile communications station cannot be received or can only be received with difficulty at least some locations in the building. The same applies in reverse to the "uplink" if, specifically as a result of unfavourable building conditions and existing shielding effects, the signals transmitted from a terminal can no longer be received by the mobile communications station.

The device according to the invention relates to improving the reception and transmission of mobile communications signals from a mobile communications network which promotes or enables, i.e. is designed to promote or enable, either a MIMO operation or a diversity operation at least in one radio direction, for example in the downlink operation (i.e. in the transmission operation from the base station to the end subscriber) or in the uplink operation (i.e. in the transmission range from the end subscriber to the base station). In other words, the system is intended to be suitable for and designed such that the transmitted and received signals operate by means of at least one transmission amplifier and at least two reception amplifiers or, vice versa, i.e. by means of at least two transmission amplifiers and at least one reception amplifier.

The solution according to the invention therefore also assumes that coaxial lines are already present in the relevant building for a broadband transmission of signals. Predominantly coaxial distribution networks, which are passive or active, are often used in the installation of individual or multiple dwelling buildings. As a result, satellite signals are transmitted for television and/or radio operation and/or in order to receive terrestrial television or radio signals, for example. The received signals are fed in both via satellite antennas and, for example, via a terrestrial antenna which is usually also connected or can optionally be connected for receiving terrestrial programmes. Using low noise converters (LNB converters) and multi-switch devices (matrix circuit), a plurality of subscribers can then be connected via a plurality of cables installed in parallel. However, one-cable-connections are also known which likewise allow programmes which can be selected on the subscriber-side to be received via a single coaxial line. In this regard, reference is also made to known solutions.

Coaxial distribution networks in a building are also known, for example for receiving programmes transmitted by cable.

For satellite reception in particular, it is known to supply a plurality of subscribers with different TV satellite signals. Conversion methods are used for this purpose, which, in a corresponding matrix, convert the programmes requested by each subscriber at a corresponding frequency.

The solution according to the invention proposes converting the signals which are received or transmitted for establishing communication via a base station into an intermediate frequency, and transmitting said signals in this intermediate frequency via a distribution network provided on the building side. In particular, the invention proposes not only using satellite intermediate frequency distribution networks for transmitting satellite-bound programmes, i.e. those broadcast via satellite, but also using these building-side distribution networks for transmitting mobile communications signals.

This makes it possible, for example, to use separate remote antennas which have a correspondingly high antenna gain in order to also receive new mobile communications standards, such as LTE, in order to then transmit the corresponding data to the connected subscribers via the house-bound coaxial distribution network.

According to the invention, a TEM line is therefore used for this purpose, i.e. a line for transmitting a transversal electromagnetic wave, in particular in the form of a coaxial line which is already present in the house distribution.

The invention also proposes designing the transmitting and receiving device according to the invention such that it both makes it possible to use a home distribution network for transmitting signals, in particular signals from an air interface having two polarisations or two antennas, via the mentioned TEM line, and also ensures the necessary synchronicity of the signals for a diversity operation or particularly a MIMO operation, and ensures that the conditions for feeding into communal installations for SAT and terrestrial reception are met. The solution according to the invention can thus, in principle, also be used for transmitting signals of this kind for a MIMO operation via a one-cable-run.

In principle, an antenna diversity device is also known from DE 10 2004 062 000 A1 for the automotive industry, which device comprises a plurality of antennas and an antenna-side frequency conversion means. At least one receiving band of an antenna is intended to be converted via said device such that the receiving bands of the at least two diversity antennas are arranged one next to the other with regard to the frequency spectrum and can be transmitted via a common transmission medium, in particular in the form of a coaxial cable. In this case, both the second path of a second antenna or the second polarisation of a dual-polarised antenna can be converted by means of a frequency conversion on the same coaxial cable. It is particularly proposed to use the local oscillator signal of the receiver for frequency conversion.

However, this solution is only suitable to a very limited extent for feeding MIMO-OFDM signals into communal installations. However, this solution is only suitable to a very limited extent for feeding MIMO-OFDM signals into communal installations. OFDM is an orthogonal frequency-division multiplexing method which is a modulation method in which more orthogonal carriers are used for digital data transmission. Each carrier is initially separately modulated. The carrier carries, per symbol, one piece of information of one or more bits, depending on which of the three free parameters, frequency, amplitude and phase, are used therefor. A channel estimation or determination of the channel matrix has to occur for the MIMO operation, on the basis of which the selected combination with regard to phase and amplitude of the two signals is then carried out for the two diffusion and antenna paths which are as uncorrelated as possible. However, this requires that the channel matrix have a particular stability. If this changes too quickly, the algorithm for selecting the correct phase and amplitude may not follow. There must therefore be absolutely no frequency errors between the converted MIMO-OFDM signals during the frequency conversion, whereas transit time differences between the OFDM symbols of the two MIMO channels are admissible, as long as these are within the guard intervals ("cyclic prefix") also provided for in LTE. If the diffusion properties of the second path, in particular with regard to phase stability, fluctuate very quickly in relation to the first path as a result of the frequency conversion, this leads to instability in the MIMO operation. These phase fluctuations and any frequency differences are therefore removed by using a common oscillator (receiver oscillator) for the converter in the antenna and in the receiver. However, the use of the receiver oscillator as a common oscillator is suitable for individual receiving installations, but is in no way suitable for communal installations, since the receiver oscillators and therefore also the two converted MIMO signals are no longer synchronised for all receivers in the communal installation. In addition, conventional communal installations for SAT and terrestrial reception are not suitable for all LTE bands (LTE2600), as a result of which the conversion is not always adequate for a receiving path.

Furthermore, in principle, transit time differences between the two OFDM symbols occur as a result of the conversion of just one OFDM-MIMO signal, which differences then however have an adverse effect if they are greater than the present guard interval. All other known methods for frequency conversion have the same problem, and therefore a one cable solution for MIMO operation for transmission in a corresponding home distribution has therefore not been reached before now.

According to the invention, however, it is proposed that the two signal paths of the, for example, dual-polarised antenna are first amplified, and then converted to different frequencies using two frequency converters, the two oscillators of which are connected to a common reference oscillator. In the relevant terminals, back-conversion then occurs by using a second reference oscillator located in the terminal or also by connection to the reference oscillator of the conversion device in the antenna.

After back-conversion, the two MIMO signals are directly evaluated in a corresponding MIMO-capable receiver. The decisive advantage of this is that the phase and amplitude relationships between the two signal paths remain synchronised and the channel matrix remains sufficiently stable. A plurality of end subscribers can therefore also be connected to the distribution network.

A preferred embodiment of the invention relates in particular to the level control at the feed-in point and in the receiver.

The invention is described in greater detail below with reference to embodiments. In the drawings, in detail:

Figure 1:
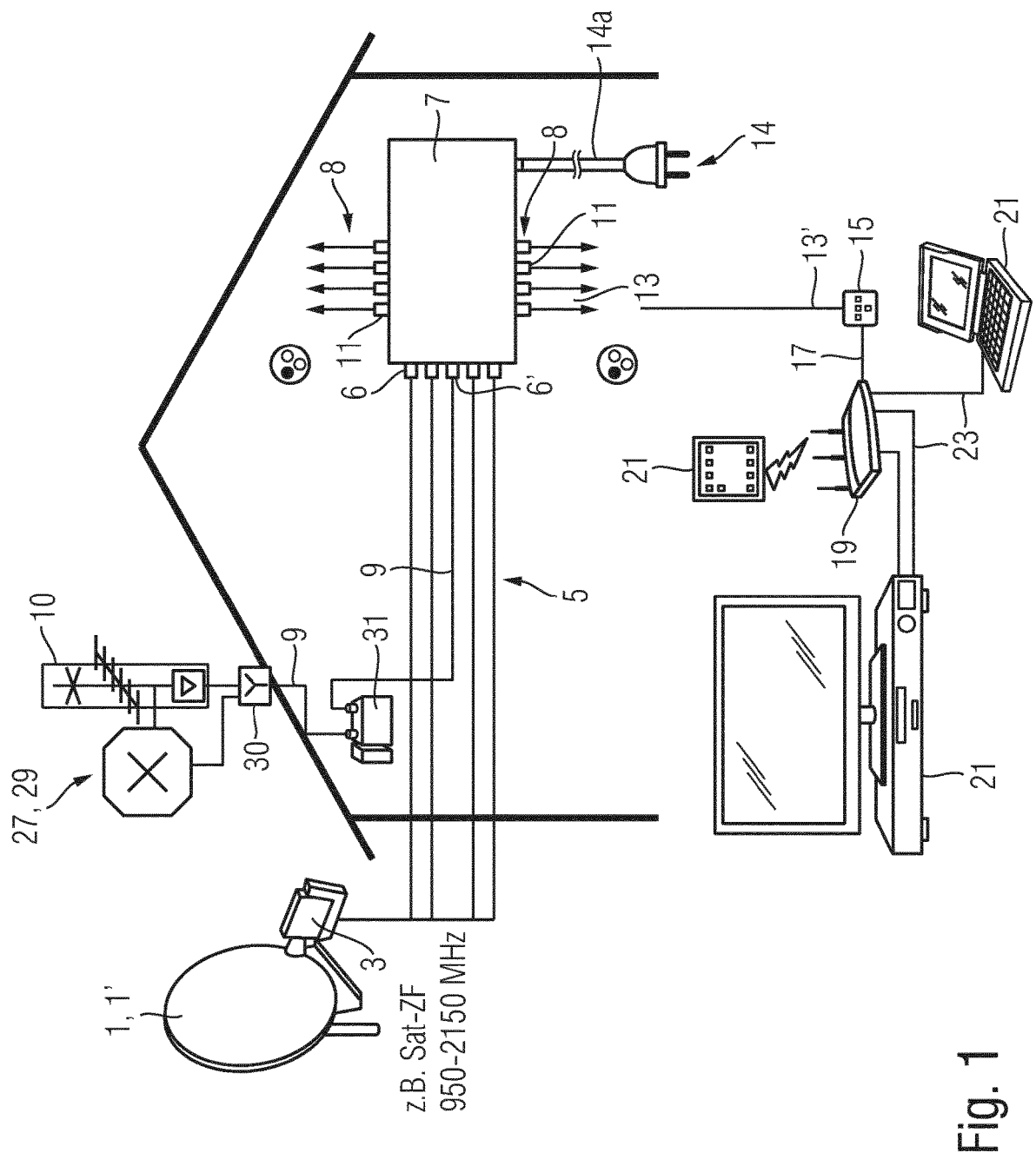
FIG. 1 is a schematic view of the invention with reference to a home distribution network.

FIG. 1 is a schematic view of a satellite antenna 1 in the form of a parabolic antenna 1', via which programmes broadcast from a satellite can be received and a converter circuit 3 can be supplied, which circuit is specifically a "low noise converter" and is also sometimes referred to as an LNB converter.

If, for example, this converter 3 is designed as a conventional converter, it is possible to receive both the vertically polarised electromagnetic waves and the horizontally polarised electromagnetic waves in two different frequency bands or frequency ranges, it being possible to supply a downstream multi-switch 7 (matrix) with the predetermined four receiving ranges or planes via four converter lines 5. For this purpose, each of the four converter lines 5 is connected to its own input 6 of a multi-switch 7.

In the majority of cases, a further input 6' is also provided on the multi-switch 7 in order for it to be possible to connect a terrestrial antenna line 9 at this point, via which line programmes received via a terrestrial antenna 10 can also be fed into the distribution network.

The described multi-switch 7 (matrix) conventionally comprises, on the output sides 8 thereof, corresponding connections 11, specifically for two times four connectable subscribers in the embodiment shown. FIG. 1 also shows that the matrix circuit 7 has not only the mentioned five inputs 6, 6', but also has (on the opposite side) a corresponding number of connections, and therefore a plurality of the shown matrix circuits 7 can be connected here in a cascading manner. The number of connectable subscribers can therefore be increased accordingly, as is in principle known. In the present case, only one multi-switch 7 (matrix circuit 7) is shown, a power unit 14 being connected to the corresponding connection sockets (not shown) at the outputs (to which one or more matrix circuits could be connected in a cascading manner). This power unit 14 is connected to a power supply via a connection cable 14a and an associated connection plug. A DC voltage generated by the integrated power unit can thus be fed in, in the desired magnitude, towards the multi-switch 7 and particularly also to the converter circuit 3 and the electronic assemblies and amplifier stages of a communication assembly which are described in the following. With regard to the connection of a power unit to a multi-switch, reference is made to known solutions, for example the prior publication EP 1 076 457 B1.

In principle, the multi-switch arrangement 7 comprises at least one or preferably a plurality (for example 4, 8, etc.) of subscriber connection lines 13. In a simplified embodiment, just one single subscriber connection line 13' can be provided, for example also because this is what is referred to as a "one-cable-solution", in which a plurality of satellite receivers can be connected in a row to one single coaxial cable 13' (for example using through-sockets, junction boxes and/or dividers).

In the embodiment shown, at least one of the closer subscriber connection lines 13 or the only one-cable connection line 13' provided leads, for example, to a divider or multimedia outlet 15, to which a router (or modem) is connected as a receiver 19 via a connection cable 17, for example. One or more subscribers or terminals 21 can then be connected to this router or modem 19 via suitable lines, usually via an Ethernet or USB cable 23, etc.

FIG. 1 shows a laptop, tablet or a receiver joined up to or connected upstream of the television set as possible terminals 21. In this respect, there are no restrictions for the use of particular devices. Similarly, a wireless or WLAN connection to the devices 21 for example can be established in the router or via a further device connected to the router, for example.

FIG. 1 also shows that an air interface 27 in the form of a radio network antenna 29 is provided, which consists, for example, of a dual-polarised antenna 29, via which mobile communication can be established, in particular with a mobile communications base station.

The signals which are received via the air interface 27 in the form of the dual-polarised radio network antenna 29 are correspondingly prepared, as described in the following, and fed into the line 9 via a duplex filter 30, into which the TV and radio network programmes received via the terrestrial antenna 10 are also fed. The signals received in this manner, like the signals received via the dual-polarised antenna, are then mutually amplified via an optionally provided preamplifier 31. An amplifier stage 31 can also be provided in the line which leads to the matrix circuit 7 and is usually designed as a coaxial line 9.

Further design details of the device according to the invention for receiving and transmitting signals for a radio network is explained in greater detail in the following with reference to FIG. 2.

Figure 2:
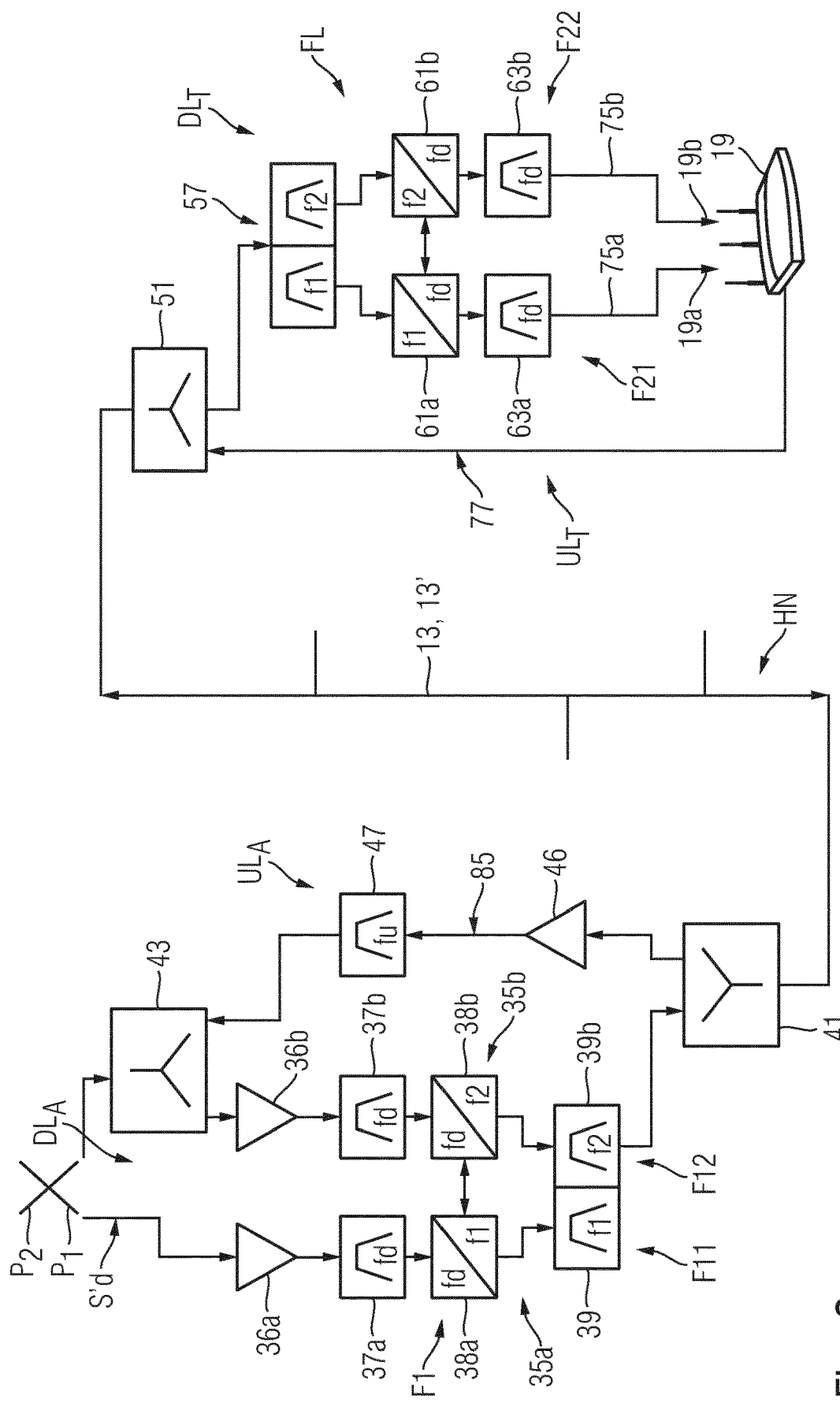
FIG. 2 is a schematic view of the solution according to the invention.

FIG. 2 shows a first frequency conversion device F1 having two parallel frequency conversion paths F11 and F12, which are provided on the air antenna side, and a second frequency conversion device connected on the subscriber-side to the home distribution network HN, which second device is also referred to hereinafter as frequency back-conversion device F2. The frequency conversion device F1 together with the two mentioned frequency conversion paths F11 and F12 form the antenna-side downlink path DLA, and the frequency back-conversion device F2 together with the two frequency back-conversion paths F21 and F22, described in the following, form the receiver-side downlink path DLT.

The first frequency conversion device F1 can be connected immediately downstream of the air antenna 27 or be integrated therein, for example. In the embodiment shown, for example, the air antenna 27 does not consist of two separate radio network antennas 29, but instead consists of a dual-polarised radio network antenna 29 which can transmit and/or receive in two polarisation planes P1 and P2 which are perpendicular to one another. In this case, the signals Sd received for example via a polarisation plane P1 can be supplied to a first downlink path 35a, which is sometimes referred to hereinafter as DLA, using a preamplifier 36a, to a downstream bandpass filter 37a, and to a first frequency converter 38a, by it being possible to convert the fed-in receiving frequency fd into a first SAT intermediate frequency fd1 in the first frequency conversion path F11.

The correspondingly converted received signals in the frequency band fd1 are then fed into the home distribution network HN via a frequency separating filter 39 and a subsequent duplex filter 41, which home distribution network consists of or comprises a plurality of or at least one transmission line 13, 13'.

The signals Sd of the air interface 27 received via the other polarisation plane P2 are fed into a second downlink path 35b (DLA) via an antenna-side duplex filter 43, which second path is designed in a similar manner to the first path 35a, specifically comprising a preamplifier 36b, a subsequent bandpass filter 37b, a frequency converter 38b which follows thereafter and a further bandpass filter 39b. The signals received, processed and converted in frequency in this manner are then likewise in turn supplied to the same connection of the duplex filter 41 via a further input of the frequency separating filter 39 and then fed into the home distribution network HN.

The special feature is that, in the embodiment shown, the transmitted signals obtained from the, for example, dual-polarised antenna 29 for the two polarisations and broadcast from a mobile radio base station (downlink operation) received signals are first amplified and then converted to different frequencies fd1 and fd2 using the two frequency converters 38a and 38b, the oscillators of the two frequency converters 38a and 38b being connected to a common reference oscillator, as discussed in the following.

On the subscriber side, a duplex filter 51 is in turn connected on the input side to the home distribution network HN comprising one or more transmission cables 13, 13', via which filter the home distribution network-side connection of the duplex filter is connected at one receiving device-side connection thereof to the subscriber-side uplink path (transmission path) ULT and is connected at a second receiving device-side connection thereof to two receiver-side parallel downlink paths DLT, i.e. two receiver-side receiving paths 75a, 75b, which comprise the second frequency conversion device F2 in the form of the mentioned frequency back-conversion device F2 having the two parallel frequency back-conversion paths F21 and F22.

A frequency separating filter 57 is connected downstream of a subscriber-side duplex connection, via which separating filter the two frequency bands fd1 and fd2 which have been converted into the ZF frequency range, i.e. particularly in the shown embodiment converted into the SAT intermediate frequency range, are correspondingly divided onto the two frequency back-conversion paths F21 and F22, a frequency back-converter 61a and 61b being connected in each of the two frequency back-conversion paths F21 and F22, via which converter the frequency bands fd1 and fd2 converted in the satellite intermediate frequency plane are back-converted into the receiving frequency fd and are each supplied via a subsequent bandpass filter 63a or 63b to a receiving device 19, for example in the form of the router, i.e. are optionally present at two connections 19a or 19b on the router. Preferably, the above-mentioned second frequency conversion device F2, which is also referred to as frequency back-conversion device F2, can be accommodated together with the two frequency back-conversion paths F21 and F22 in the router or modem 19.

The reversed path from the receiver or router to the air antenna comprises a receiver-side or subscriber-side uplink path ULT, denoted by reference numeral 77, from the receiver 19, for example in the form of the mentioned router or modem, to the second receiver-side connection on the duplex filter 51, the transmitted signals Su fed in via this from the subscriber or receiver then being supplied via the subscriber-side duplex filter 51 and the home distribution network HN to the antenna-side uplink path ULA, denoted by reference numeral 85, which extends in parallel with the two frequency conversion paths F11 and F12 between two corresponding connections between the two duplex filters 41 and 43, and then leads via the antenna-side connection of the duplex filter 43 to the air antenna 27. In this case, the antenna-side uplink path ULA can likewise also comprise an amplifier stage 46 in the uplink direction and a downstream band filter 47. Therefore, the subscriber-side uplink path ULT and the frequency back-conversion device F2 (comprising the two frequency back-conversion paths 75a, 75b), and the antenna-side uplink path ULA and the frequency conversion device F1 (comprising the two frequency conversion paths 35a and 35b), are each connected in parallel.

The transmitted signals Su coming from the receiver 19 or subscriber 21 are therefore supplied via the subscriber-side or receiving device-side uplink path 77, the home distribution network HN and the antenna-side uplink path 85 to the radio network antenna 29, i.e. in the embodiment shown the radiator which radiates in the polarisation plane P2. However, by contrast with the downlink transmission path, frequency conversion or frequency back-conversion does not take place in this uplink path.

The signals received via the mentioned air interface 27 in the form of the radio network antenna 29 (preferably in the form of a dual-polarised antenna) therefore each pass through a preamplifier (LNA) 36a, 36b, optionally comprising or not comprising an amplification controller depending on the reception level. In this case, the subsequent frequency conversion consists of the two frequency converter paths F11 and F12, which typically each convert into an intermediate frequency range ZF in two conversion steps, which range is not needed for digital radio reception (in particular DVB-S/S2 and DBV-T, very rarely DAB and DVB-H) in the distribution network (SAT-ZF, frequency ranges 174-230 MHz and 470-790 MHz DVB-T). Preferably, the frequency range is used for the special channels, which are only used for transmission in cable networks but not used in individual dwelling buildings or smaller multiple dwelling buildings which have SAT and terrestrial receiving antennas. The relevant frequency ranges are, for example, between 110 and 174 MHz (lower special channel range), 230-300 MHz (upper special channel range) and 300-470 MHz (expanded special channel range).

In one particular embodiment, the receiving frequency range (downlink) of the signals received via one polarisation plane P1 of from 792 MHz to 822 MHz can for example be reproduced at a frequency range of from 111 MHz to 141 MHz, and the signals received via the second polarisation plane P2 can be reproduced at the frequency range of from 142 MHz to 172 MHz.

Since a MIMO operation is not currently required for the uplink, this embodiment only relates to the downlink, but in principle this arrangement can be extended to the uplink according to the same principle.

As previously mentioned, a corresponding back-conversion to the original frequency range fd can then occur at the end subscriber, the signals then being made available at two connections and being fed into the MIMO-capable receiving module (e.g. router 19) via the mentioned home distribution network.

FIG. 2 has already shown that the two frequency converters 38a and 38b in the two antenna-side frequency conversion paths F11 and F12 (i.e. the downlink paths DLA) on the antenna side, like the two frequency back-converters 61a and 61b in the two frequency back-conversion paths F21 and F22 in the downlink path DLT on the subscriber side, are correspondingly matched, in particular correspondingly synchronised, for example by using a common reference oscillator. The same also applies to the additional reference oscillator in the terminal 19, for example in the router 19'.

Possible conversion variants are explained in greater detail in the following with reference to FIGS. 3 and 4.

Figure 3:
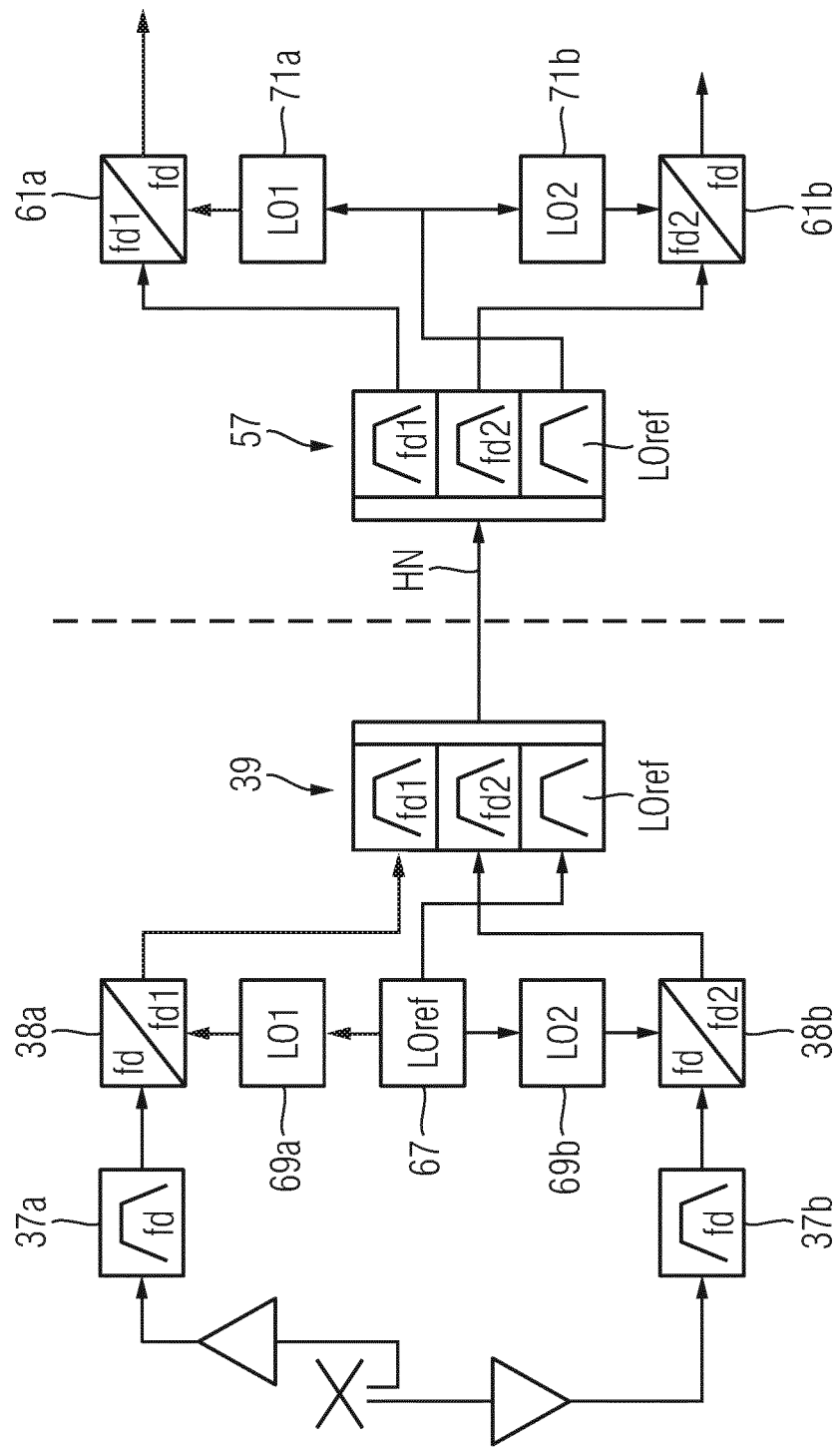
FIG. 3 is a detailed view of a variant of the solution according to the invention.

FIG. 3 also shows the mentioned antenna-side reference oscillator 67, via which two local oscillators 69a and 69b are controlled in order to control the frequency converters 38a and 38b (which conventionally consist of or comprise mixers).

In this embodiment, both the two ranges fd1 and fd2, which are received via the two polarisations P1 and P2 and converted in frequency into two mutually offset frequency bands, and the reference oscillator frequency LOref are fed into the home distribution network HN via the separating filter 39 (the reference oscillator frequency LOref also being offset to the two fed-in transmitted frequency bands fd1 and fd2).

On the subscriber-side, corresponding frequency separation is carried out via the mentioned additional separating filter 57, in which separation, as previously mentioned, the two mutually offset ZF frequency bands fd1 and fd2, converted into the SAT intermediate frequency plane, are back-converted via the two frequency back-converters 61a and 61b into the receiving frequency fd. A subscriber-side reference oscillator, for example provided in the terminal 19 (e.g. router), could be used for this purpose. In this case, frequency and phase errors will occur in the conversion and back-conversion path, the errors however having an effect synchronously in frequency and phase for the two branches after back-conversion, by means of the connection to a reference oscillator for the two branches, and as such compensating for one another.

However, in the embodiment shown according to FIG. 3, another path is proposed, in which the reference oscillator frequency LOref in the antenna-side frequency conversion device F1 is now likewise used again for controlling the two local oscillators 71a and 71b in the receiver-side or subscriber-side downlink path DLT, which reference oscillator frequency controls the corresponding frequency back-converter 61a and 61b in order to back-convert the transmitted frequencies fd1 and fd2 into the receiving frequency fd.

After the described frequency back-conversion into the receiving frequency range fd, the two MIMO signals are therefore evaluated directly in a corresponding MIMO-capable receiver, as a result of which the phase and amplitude relationship between the two signal paths remains synchronous and the channel matrix remains sufficiently stable.

As a result, additional end subscribers can also be connected to the distribution network.

In the variant according to FIG. 3, the frequency synchronisation between the converted LTE-MIMO channels is therefore ensured by using a common reference oscillator. In this case, frequency and phase errors of the reference oscillator are completely eliminated after the conversion downstream of the antenna and after the back-conversion in the receiver. Since all receivers in the communal installation use the reference oscillator of the conversion device in the antenna, the necessary synchronicity between the two MIMO-OFDM channels is also provided for all receivers in a communal installation. In addition, by converting the two MIMO-OFDM signals, the transit time differences between the two OFDM symbols decreases accordingly, which minimises the reserves by comparison with the limiting value specified by the guard interval.

Figure 4:
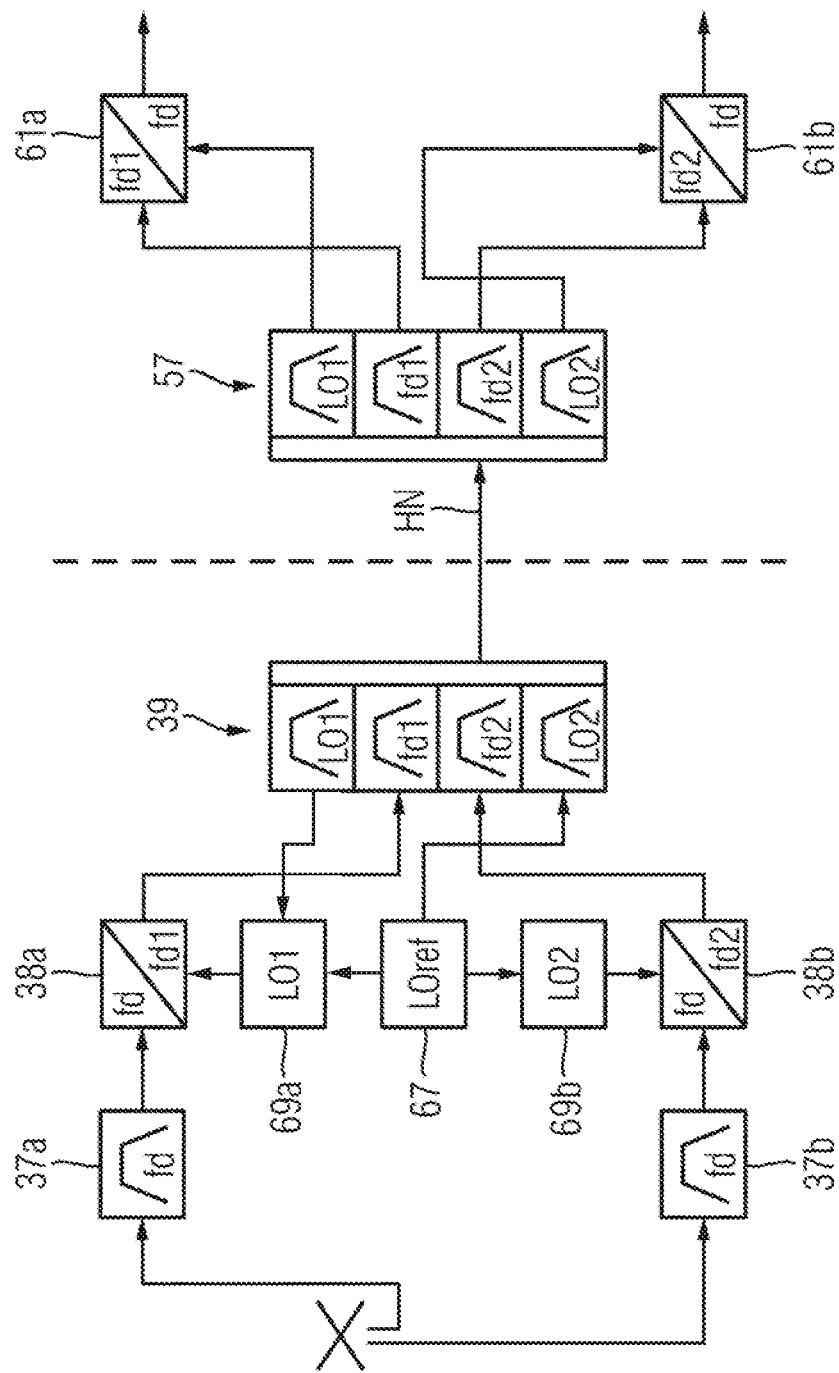
FIG. 4 is a further variant of the solution according to the invention.

In the variant according to FIG. 4, the frequency synchronisation between the converted LTE-MIMO channels occurs by means of the antenna-side local oscillators 69a and 69b, the local oscillator frequencies LO1 and LO2 of which are likewise supplied via the separating filters 39 and 57 of the subscriber-side frequency back-conversion device F2. On the subscriber side, frequency separation again occurs via the separating filter 57 located there, and therefore the local oscillators can directly control the subscriber-side frequency back-converters 61a, 61b located there.

The embodiment according to FIG. 4 therefore describes a variant in which the oscillators in the frequency conversion device F1 (downstream of the antenna and upstream of the home distribution network HN) are also used on the receiver side in the frequency back-conversion device F2. This principle is qualitatively preferable to the principle shown in FIG. 3, since no residual errors are caused as a result of different local oscillators in the antenna-side frequency conversion device F1 and the subscriber-side frequency back-conversion device F2 in the receiver, but rather there is optionally an advantage in phase noises. In addition, this variant creates a simplified solution for the receiver, i.e. for the subscriber 21. However, it can be disadvantageous, by contrast with the solution shown in FIG. 3, in that it can be difficult for the transmission of the frequencies of the frequency conversion oscillators to find additional gaps in the transmission frequency range.

Furthermore, within the scope of the invention, an advantageous level control can be carried out at the feed-in point and at the receiver.

This level control or adjustment causes the limited dynamic range of the distribution network, which for example is provided by the limited shielding attenuation, to be correspondingly utilised. A restricted frequency band, for example just a network operator, can also be converted when the available bandwidth is limited. An advantageous option when transmitting a synchronisation signal based on the reference oscillator on the antenna is the use of the level of the signal for determining the attenuation of the distribution network and therefore for amplification control in the receiver.

It is further noted that the mentioned device can be designed such that the receiver 19 is connected to the air antenna 27 by a receiver-side uplink path ULT, 77, the home distribution network HN and an antenna-side uplink path ULA, 85, an amplifier 46 being provided on this path, preferably in the antenna-side uplink path ULA, 85, which amplifier comprises an amplification controller such that the admissible equivalent isotropic radiation power (EIRP) is not exceeded.

The invention claimed is:

1. A device for receiving and transmitting signals for a radio network, comprising:
    an air interface comprising a MIMO antenna, at least in the form of a dual-polarized antenna or in the form of two antennas, for carrying out a MIMO operation at least in a downlink operation or an uplink operation,
    at least one transmission amplifier,
    at least two reception amplifiers,
    the at least one transmission amplifier and the at least two reception amplifiers being connected to a home distribution network, into which received signals obtained via the air interface are fed and into which transmitted signals of the air interface obtained via the home distribution network can be supplied,
    an antenna-side frequency conversion device provided between the air interface and the home distribution network,
    the antenna-side frequency conversion device comprising at least one frequency converter, via which
    a) the received signals obtained via at least one polarization of the dual-polarized antenna; or
    b) the received signals obtained via at least one of the at least two antennas of a transmitting frequency,
    can be converted from a received frequency range into an intermediate frequency range which is unused and/or free in the home distribution network,
    at least one receiver-side frequency back-conversion device provided between the home distribution network and a receiver or in the receiver,
    the receiver-side frequency back-conversion device designed such that a frequency back-conversion of frequencies converted in an unused frequency range can be converted back into the received frequency range, and
    wherein a reference oscillator frequency signal, which is mutually offset thereto and produced by a reference oscillator, is also fed into the home distribution network, via which local oscillators for controlling the receiver-side frequency back-conversion device, which are provided in the receiver-side downlink path, can be controlled, and the receiver is designed such that information regarding the strength of the reference oscillator frequency signal fed into the home distribution network by the antenna-side frequency conversion device is stored therein, and
    an attenuation measuring device for the received reference oscillator frequency signal provided in the receiver, via which a control signal can be supplied to the amplifiers for amplification control.

2. The device according to claim 1 wherein the antenna-side frequency conversion device is provided on or in the air interface or the associated antenna.

3. The device according to claim 1, wherein the antenna-side frequency conversion device comprises two antenna-side downlink paths, on which the signals received via the at least two antennas or via the at least two polarizations of the at least one dual-polarized antenna can be separately converted into different intermediate frequency ranges, which ranges are mutually offset.

4. The device according to claim 3, wherein two receiver-side downlink paths are provided in the receiver-side frequency back-conversion device, via which the mutually offset intermediate frequency ranges, which are divided via a separating filter, can be converted back into the received frequency range, in each case via a frequency back-converter provided in each of the two receiver-side downlink paths.

5. The device according to claim 3, wherein the two antenna-side downlink paths each comprise a frequency converter, with each of which a local oscillator for frequency conversion is associated, the two local oscillators being synchronised with one another by a common reference oscillator.

6. The device according to claim 1, wherein the antenna-side frequency conversion device is designed such that two local oscillators are provided for the two frequency converters, each of the two local oscillators being structured to produce a local oscillator frequency which is fed into the home distribution network, the receiver-side frequency back-conversion device being designed such that two local oscillators are operated by the two local oscillator frequencies, via which oscillators the associated frequency back-converters in the two receiver-side downlink paths are controlled.

7. The device according to claim 6, wherein the reference oscillator for controlling the two local oscillators is provided in the receiver in order to operate the two frequency back-converters.

8. The device according to claim 1, wherein level control is provided for controlling the signal level of the received signal, at a feed-in point in the receiver.

9. The device according to claim 1 further including two antenna-side downlink paths each providing a frequency converter, and wherein, at least in the two antenna-side downlink paths, one of the reception amplifiers is connected upstream of each of the frequency converters provided on said paths.

10. The device according to claim 1, wherein the receiver is connected to the air interface by a receiver-side uplink path, the home distribution network and an antenna-side uplink path, an amplifier being provided in the antenna-side uplink path, which amplifier comprises an amplification controller such that an admissible equivalent isotropic radiation power is not exceeded.

11. The device according to claim 1, wherein, at the output of the antenna-side frequency conversion device before feeding into the home distribution network, a frequency separating filter is provided for feeding in the received signals converted into different intermediate frequency ranges, and/or in that an additional frequency separating filter is provided on the input side in the receiver-side frequency back-conversion device, via which the transmitted signals converted into different intermediate frequency ranges can be divided onto two receiving-side downlink paths.

12. The device according to claim 1, wherein the antenna-side frequency conversion device is integrated in the region of the air interface or in the antenna, and/or the receiver-side frequency back-conversion device is integrated in the receiver.

13. An arrangement for receiving and transmitting signals for use with (a) a home distribution network into which received signals obtained via an air interface can be fed and into which transmitted signals of the air interface obtained via the distribution network can be supplied, and (b) a receiver having a received frequency range and operatively coupled to said distribution network, the arrangement comprising:
  an air interface comprising a MIMO antenna structure including at least one of (x) a dual-polarized antenna and (y) plural antennas, the MIMO antenna structure being structured to carry out MIMO uplink and/or downlink wireless communication operations,
  an antenna-side frequency converter provided between the air interface and the distribution network, the antenna-side frequency converter comprising at least one transmission amplifier and plural reception amplifiers, the antenna-side frequency converter being structured to frequency-convert received transmitting frequency signals obtained via (i) at least one polarization of the dual-polarized antenna or (ii) at least one of the at least plural antennas, into an intermediate frequency range which is unused and/or free in the distribution network,
  at least one receiver-side frequency back-converter provided between the distribution network and the receiver, the receiver-side frequency back-converter structured to convert back the frequency-converted received transmitting frequency signals into the received signals in the received frequency range, and
  a reference oscillator that produces a reference oscillator frequency signal having a frequency that is offset from the intermediate frequency range, the reference oscillator feeding the reference oscillator frequency signal into the distribution network to control at least one operating frequency of the receiver-side frequency back-converter,
  wherein the receiver is structured to store information regarding the strength of the reference oscillator frequency signal, and comprises an attenuation measuring device for measuring the attenuation of the reference oscillator frequency signal to produce an amplification control signal for the amplifiers.

14. The arrangement according to claim 13, wherein the antenna-side frequency converter comprises plural antenna-side downlink paths which separately convert into different but mutually offset intermediate frequency ranges, signals received via the plural antennas or via at least two polarizations of the at least one dual-polarized antenna.

* * * * *